United States Patent [19]

Dixon et al.

[11] 4,066,630

[45] Jan. 3, 1978

[54] END CAPPED POLYALKYLENE CARBONATES HAVING IMPROVED THERMAL STABILITY

[75] Inventors: Dale D. Dixon, Kutztown; Michael E. Ford, Center Valley; Gerald J. Mantell, Allentown, all of Pa.

[73] Assignee: Air Products and Chemicals, Inc., Allentown, Pa.

[21] Appl. No.: 757,909

[22] Filed: Jan. 10, 1977

[51] Int. Cl.$^2$ ............................................. C08G 63/62
[52] U.S. Cl. .................................................. 260/77.5 D
[58] Field of Search ............... 260/77.5 D, 2 BP, 463, 260/47 XA

[56] References Cited

U.S. PATENT DOCUMENTS

| | | | |
|---|---|---|---|
| 3,026,298 | 3/1962 | Lee et al. | 260/77.5 D |
| 3,177,179 | 4/1965 | Lee et al. | 260/77.5 D |
| 3,248,415 | 4/1966 | Stevens | 260/77.5 D |
| 3,585,168 | 6/1971 | Inoue et al. | 260/77.5 D |
| 3,689,462 | 9/1972 | Maximovich | 260/77.5 D |
| 3,706,713 | 12/1972 | Hull | 260/77.5 D |
| 3,900,424 | 8/1975 | Inoue et al. | 260/77.5 D |

*Primary Examiner*—Theodore E. Pertilla
*Attorney, Agent, or Firm*—Russell L. Brewer; Barry Moyerman

[57] ABSTRACT

Polycarbonates, of the type formed by reacting an aliphatic or cycloaliphatic 1,2-monoepoxide with carbon dioxide and having substantially alternating units of epoxide and carbon dioxide, are improved in thermal stability by reacting the free hydroxyl groups thereon with a hydroxyl reactive organic compound.

15 Claims, No Drawings

END CAPPED POLYALKYLENE CARBONATES HAVING IMPROVED THERMAL STABILITY

BACKGROUND OF THE INVENTION

1. Field

This invention relates to polycarbonates having improved thermal stability and to a process for preparing such polycarbonates.

2. Description of the Prior Art

In recent years, there has been extreme interest expressed in a class of high molecular weight polycarbonates formed by reacting an aliphatic or cycloaliphatic epoxide with carbon dioxide. These high molecular weight polycarbonates are useful as molding compositions in the formation of fibers and articles. Typically, the polycarbonates are produced by reacting an epoxide, e.g. ethylene oxide, propylene oxide, isobutylene oxide with carbon dioxide under pressure in the presence of an organometallic catalyst. Amplification of this description of the process is shown in U.S. Pat. No. 3,585,168, U.S. Pat. No. 3,900,424 and U.S. Pat. No. 3,953,383. Variations in this basic process are reported in U.S. Pat. No. 3,706,713, U.S. Pat. No. 3,689,462 and U.S. Pat. No. 3,699,079.

Hydroxyl groups on low molecular weight liquid polycarbonates of the type formed by reacting aromatic polyhydric alcohol and phosgene or those obtained by reacting a dihydric alcohol and bischlorocarbonate have been capped with monomers to form solid polymers. Examples of capping agents include disubstituted acids for formsing polyester-polycarbonates and isocyanates to form polyurethane-polycarbonates. Exemplary formulations are shown in U.S. Pat. Nos. 3,248,414; 2,999,844; 3,544,657; 3,897,391; and 3,689,462.

SUMMARY OF THE INVENTION

This invention relates to polycarbonates, particularly polyalkylene carbonates formed by reacting an epoxide and carbon dioxide, having improved thermal stability. The improved thermal stability of the polyalkylene carbonates is imparted by reacting the free hydroxyl groups on the polyalkylene carbonate with a hydroxyl reactive organic compound of the type capable of forming an oxygen-carbon bond preferably without forming a hydroxyl group on the capping carbon atom. This reaction results in the formation of an oxygen-carbon bond which is more stable than the oxygen-hydrogen bond to depolymerization and thereby enhances thermal stability.

Accordingly, an aspect of this invention is to provide a normally solid polycarbonate with substantially alternating units of epoxide and carbon dioxide of improved thermal stability.

It is another aspect of the invention to form polycarbonates suited for producing molded products which are more resistant to thermal degradation than are molded products prepared from prior art polycarbonates.

It is a further aspect of the invention to provide polyalkylene carbonates than can be processed over a wider temperature range than was previously possible and to promote their life under normal use conditions.

It is still a further object to provide polyalkylene carbonates which can be utilized for the manufacture of films and packages and the in situ pasteurization of contents therein.

DESCRIPTION OF THE PREFERRED EMBODIMENT

The polycarbonates suited for practicing this invention are normally solid at room temperature (70° F) and atmospheric pressure and are represented by the formula:

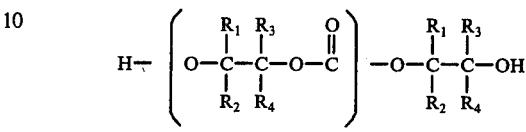

wherein:

$R_1$ is a hydrogen atom, a halomethyl group, or a hydrocarbyl group having from 1 to 6 carbon atoms;

$R_3$ is hydrogen, a halomethyl group or a hydrocarbyl group having from 1 to 6 carbon atoms;

$R_2$ and $R_4$ are hydrogen, or a hydrocarbyl group having from 1 to 6 carbon atoms; or $R_1$, $R_2$, $R_3$ and $R_4$ are combined together constituting a carbocyclic ring of from 4 to 7 carbon atoms.

The polycarbonates represented by the formula above are normally solid at room temperature (70° F) and atmospheric pressure and contain alternating units of epoxide and carbon dioxide. These polycarbonates are formed by reacting an epoxide and carbon dioxide to form high molecular weight polycarbonates of from about 50,000 to 500,000, and preferably a molecular weight of from about 75,000 to 150,000. This converts to a plurality of repeating units (n) (as shown in a subsequent formula) of from about 250 to 6,500, and preferably from 500 to 1,500.

The epoxides suited for forming the polycarbonates generally are 1, 2-epoxides which are conventionally used in forming polycarbonates represented by the formula above. The epoxides can be substituted with a plurality of organo groups represented by $R_1$, $R_2$, $R_3$ and $R_4$, as for example hydrocarbyl groups which, by definition, include lower alkyl, alkenyl, cycloaliphatic, aryl groups, and substituted groups, e.g. chlorine, alkyl, hydroxyl, ester and aldehyde groups. Typically, the groups pendant on the epoxide reactant are hydrogen, lower alkyl, e.g. methyl and ethyl, or phenyl groups. Examples of suitable epoxides include ethylene oxide, propylene oxide, styrene oxide, isobutylene oxide, 2,3 butylene oxide, epichlorohydrin, butylene oxide, diphenylethylene oxide, trimethylethylene oxide, cyclohexane epoxide, methyl cyclohexane epoxide, ethylene cyclohexane epoxide, and the like. Of these, ethylene and propylene oxide are preferred.

End capping of the normally solid polycarbonates of this invention is accomplished by reacting the polycarbonate with a hydroxyl reactive organic compound under conditions effective for replacing the hydrogen atom and forming an oxygen-carbon bond. Any hydroxyl reactive organic compound that is capable of (1) reacting with the active hydrogen atom for forming an oxygen-carbon bond with the polymer, and (2) does not effect substantial polymer degradation and degeneration under the reaction conditions, can be used in practicing this invention. Preferably, the hydroxyl reactive organic compound does not result in the formation of a hydroxyl group on the capping atom. Further, these hydroxyl reactive organic compounds may be substituted with any group, e.g. nitro, halo, alkyl, sulfonyl, etc. so long as it does not result in polymer degradation.

Classes of hydroxyl reactive organic compounds which can be used for end capping the hydroxyl groups on the polycarbonates of this invention include: alkylating agents, e.g. organolhalides such as methyl chloride, bromide, and iodide, ethyl bromide, allyl chloride, and chlorocyclohexane; carboxylic acid halides such as lower alkyl $C_1$-$C_{12}$ acid halides, e.g. acetyl chloride, phosgene, propionyl chloride, benzoyl chloride, cyclohexanoyl chloride; acids such as fumaric, maleic, acetic, malonic, succinic and their anhydrides (which by definition herein are acids), and the like; epoxides such as ethylene oxide, propylene oxide, styrene oxide, cyclohexane epoxide, etc; unsaturated hydrocarbyls, e.g. divinyl sulfone, acrylonitrile, lower alkyl ($C_1$-$C_6$) esters of acrylic acid, e.g. methyl methacrylate, ethyl acrylate, 2-ethylhexyl acrylate, and the corresponding acids, e.g acrylic and methacrylic acid, methylvinyl ketone, ethylvinyl ketone, phenylvinyl ketone, acrylyl chloride, methacrylyl chloride, and the like; reactive methylol compounds, e.g. those generally having conjugated unsaturation with respect to the methylol group, e.g. N-methylolacrylamide and trimethylol phenol, and methylol melamines; and isocyanates such as toluene diisocyanate, phenyl isocyanate, phenyl diisocyanate, hexamethylene isocyanate, hexamethylene diisocyanate, isocyanato diphenylmethane, methyl isocyanate, and so forth, urea and urethanes.

Other hydroxyl reactive compounds which perform in essentially the same manner as the aliphatic and aromatic alkylating agents above and can be used here include organosulfates, e.g. dimethyl sulfate and diphenyl sulfate.

Some hydroxyl reactive compounds although forming an oxygen-carbon bond with the polymer also result in forming a hydroxyl group on the capping carbon atom. Although these organic compounds improve thermal stability, they are not as effective as others. It is believed the hydroxyl group destabilizes the oxygen-carbon bond to a slight degree. Those compounds forming a hydroxyl group on the capping carbon atom include formaldehyde, chloral acetaldehyde, crotonaldehyde, acrolein and the like.

The use of monofunctional hydroxyl reactive compounds permits a single end capped group on the polycarbonate resin. On the other hand, the use of polyfunctional hydroxyl reactive compounds may result in a cross-linked copolymer and permits the addition of other compounds to the polycarbonate. For example, acrylic acid or acrylyl chloride can cap the hydroxyl group and provide a reactive unsaturated unit pendant from the polycarbonate molecule which can be polymerized with unsaturated monomers to produce a modified polycarbonate blend.

In end capping the free hydroxyl groups on the polycarbonate resins, the hydroxyl groups are contacted with the hydroxyl reactive organic compound under conditions sufficient for effecting reaction and capping substantially all of the hydroxyl groups. Generally, because the polymer is a solid, it is preferable to end cap the polycarbonate by forming a dispersion of polycarbonate and hydroxyl reactive compound, by milling the polymer and hydroxyl reactive organic compound or by extruding the compounds. In the first case, the polycarbonate is dispersed in an inert solvent or carrier such as tetrahydrofuran, chloroform, dioxane, benzene, acetone or methylene chloride, and the reaction carried out in that medium. In milling, considerable care must be exercised to insure that the temperature of the polycarbonate resin does not exceed the thermal degradation temperature.

In forming the end capped polycarbonate resin, sufficient hydroxyl reactive organic compound is blended and contacted with the polycarbonate resin to react with substantially all of the free hydroxyl groups. To insure that substantially all of the hydroxyl groups are reacted, at least 20% of the stoichiometric excess of hydroxyl reactive compound is mixed with the polycarbonate.

After end capping, the polyalkylene carbonate polymer is more nearly represented by the formula:

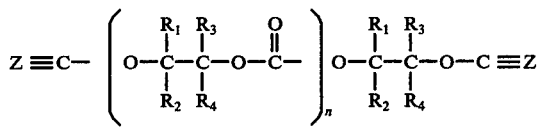

wherein $R_1$ is a halomethyl or a hydrogen, or a hydrocarbyl group having from 1 to 6 carbon atoms;

$R_3$ is hydrogen, a halomethyl group or a hydrocarbyl group having from 1 to 6 carbon atoms;

$R_2$ and $R_4$ are hydrogen or a hydrocarbyl group having from 1 to 6 carbon atoms; or $R_1$, $R_2$, $R_3$ and $R_4$ are combined together constituting a carbocyclic ring of from 4 to 7 carbon atoms; and $n$ is a number from 250 to 6,500;

Z is hydrogen, or the remainder of a hydrocarbyl radical having from 1 to 20 carbon atoms and substituted derivatives thereof.

In the above formula, Z by definition, is the remainder of a hydrocarbyl group where the oxygen atom is bonded to a carbon atom and the valences pendant from that carbon atom are satisfied by attachment to another carbon atom or other atom, e.g. hydrogen, halogen, or oxygen. The essential feature is to end cap the hydroxyl group with an organic compound sufficiently reactive to form the oxygen-carbon bond as those groups pendant from that carbon atom can be any atoms sufficient to satisfy the valences on the carbon as represented by Z and preferably without forming a hydroxyl group on the capping carbon atom.

The following examples are provided to illustrate preferred embodiments of this invention, and are not intended to restrict the scope thereof. All temperatures are in degrees centigrade.

EXAMPLES

A 7.5 gram sample of a polyethylene carbonate (PEC) formed by the procedure of Example 1 in U.S. Pat. No. 3,900,424 having alternating units of ethylene oxide and carbon dioxide, a molecular weight of 100,000 and a melting point of about 190°-200° C was dissolved in 100 milliliters chloroform. The polyethylene carbonate had free hydroxyl groups as evidenced by the presence of frequencies in the infrared spectrum at 3480 cm$^{-1}$ and 3640 cm$^{-1}$. The free hydroxyl groups assuming, 1.5 × 10$^{-4}$ mols hydroxyl group in the polyethylene carbonate, were end capped by adding 2.85 gram (0.05 mols) methyl isocyanate to the polyethylene carbonate solution and then stirring at ambient temperature (20°-25° C) for about 40 hours. The reaction medium then was added slowly to methanol and a precipitate formed which was removed by filtration. Residual solvent in the precipitate was removed by placing the polymer in a vacuum. Infrared analysis of the resulting polymer showed that hydroxyl groups were reacted and capped with methyl urethane units.

EXAMPLE 2

The procedure of Example 1 was followed except that phenyl isocyanate was substituted for methyl isocyanate, thus providing a polyethylene carbonate end capped with phenyl urethane groups.

EXAMPLE 3

A 10g portion of polypropylene carbonate (PPC) having about $2 \times 10^{-4}$ mols hydroxyl group, a molecular weight of approximately 100,000, melting point of 180°–190° C and alternating units of propylene oxide and carbon dioxide was dissolved in 100 ml of chloroform and 11.3 ml of pyridine. Then, 0.14 mols of acetyl chloride were added over a one-half hour period to the polypropylene carbonate solution. After stirring for about two hours and maintaining a temperature of 25° C, the resulting mixture was washed with a 5% aqueous hydrochloric acid followed by washing with 5% aqueous sodium bicarbonate solution. The mixture was then slowly added to methanol and a precipitate resulted. Residual solvent was removed from the polymer by vacuum. Analysis of the product indicated that essentially all of the free hydroxyl groups were capped with acetyl groups.

EXAMPLE 4

The procedure of Example 3 was followed except that polyethylene carbonate was substituted for polypropylene carbonate.

EXAMPLE 5

The procedure of Example 4 was followed except that 0.05 moles maleic anhydride was substituted for acetyl chloride, and the pyridine omitted.

EXAMPLE 6

An end-capped polycarbonate having a hydroxyl group pendent on the capping carbon atom was prepared by dissolving a two gram portion of polyethylene carbonate (PEC) in 50 ml chloroform. To this dispersion was added about 4.42 grams or 0.03 mols chloral. The components were stirred at room temperature (25° C) for about 18 hours and then at 62° C for 24 hours. After the 24 hour period, approximately 350 mls methanol were added to precipitate the solid, capped polyethylene carbonate. Residual solvent in the polymer was removed by vacuum to yield 1.9 grams or about 96% capped polyethylene carbonate. Infrared analysis of the material showed a low concentration of hydroxyl groups at 3450 cm$^{-1}$.

EXAMPLE 7

Untreated polyethylene and polypropylene carbonate, i.e. those having terminal hydroxyl groups and end capped polyethylene and polypropylene carbonate resins, were evaluated for thermal stability by heating a 0.005 gram sample of the resin at a rate of 2½°/min. from a temperature of 120° C to the decomposition temperature as indicated by a weight loss of 5% based on the weight of the sample. The atmospheric environments used in the evaluation of the samples were air and nitrogen. The results of the evaluation are noted in Table 1.

TABLE 1

| POLY-CARBONATE | | DECOMPOSITION TEMPERATURE ° C UNTREATED POLYCARBONATE | DECOMPOSITION TEMPERATURE ° C END CAPPED POLYCARBONATE |
|---|---|---|---|
| Ex. 1 Air | (PEC) | 210 | 234 |
| Ex. 1 N$_2$ | " | 205 | 249 |
| Ex. 2 Air | " | 210 | 230 |
| Ex. 2 N$_2$ | " | 205 | 215 |
| Ex. 3 Air | (PPC) | 218 | 236 |
| Ex. 3 N$_2$ | " | 215 | 240 |
| Ex. 4 Air | (PEC) | 210 | 235 |
| Ex. 4 N$_2$ | " | 205 | 235 |
| Ex. 5 Air | " | 210 | 233 |
| Ex. 5 N$_2$ | " | 205 | 234 |
| Ex. 6 Air | " | 210 | 227 |
| Ex. 6 N$_2$ | " | 205 | 219 |

The above results show that in each case where an oxygen-carbon bond was formed and the active hydrogen atom replaced, the decomposition temperature of the polycarbonate increased substantially both in air and in nitrogen. The results also show that the different hydroxyl end capping agents in themselves had little influence on the decomposition temperature. Once the oxygen-carbon bond was formed, the decomposition temperature was increased by about the same amount and the remaining portion of the organo or hydrocarbyl part of the end capping agent was insignificant except for the chloral treated polycarbonate. In that case, the thermal stability was less than for the other compounds but better than the untreated polycarbonates.

What is claimed is:

1. A process for improving the thermal stability of a normally solid polycarbonate having substantially alternating epoxide and carbon dioxide units and having a plurality of free hydroxyl groups represented by the formula:

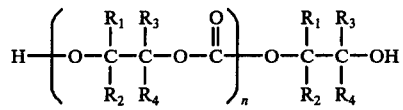

wherein:
 R$_1$ is hydrogen, a halomethyl group, or a hydrocarbyl group having from 1 to 6 carbon atoms;
 R$_3$ is hydrogen, a halomethyl group, or a hydrocarbyl group having from 1 to 6 carbon atoms;
 R$_2$ and R$_4$ are hydrogen or a hydrocarbyl group having from 1 to 6 carbon atoms;
 R$_1$, R$_2$, R$_3$ and R$_4$ are combined together constituting a carboxylic ring of from 4 to 7 carbon atoms; and
 n is a number from about 250–6,500;
 which comprises end-capping at least a portion of the free hydroxyl groups of said polycarbonate by reacting said hydroxyl groups with a hydroxyl reactive organic compound having the ability to replace the active hydrogen atom on said hydroxyl group for forming an oxygen-carbon bond, said reaction being carried out under conditions sufficient for effecting said reaction.

2. The process of claim 1 wherein R$_2$ and R$_4$ are hydrogen atoms.

3. The process of claim 2 wherein R$_1$ and R$_3$ are hydrogen, a lower alkyl group having from 1 to 2 carbon atoms, or a phenyl group.

4. The process of claim 3 wherein said hydroxyl reactive organic compound is selected from the group consisting of an organohalide, an organic acid chloride, an epoxide, an organic acid, organic acid ester, activated olefin, an organic isocyanate, an organic urea and urethane, an organic methylol compound and an organosulfate.

5. The process of claim 3 wherein said end-capping is accomplished by dispersing said polycarbonate in an inert carrier, reacting the polycarbonate with said hydroxyl reactive organic compound, and then recovering the resulting end-capped polycarbonate from said inert carrier.

6. The process of claim 4 wherein said hydroxyl reactive organic compound is a monofunctional organic compound.

7. The process of claim 6 wherein $R_3$ is hydrogen atom, or a methyl group.

8. The process of claim 7 wherein $R_1$ is hydrogen, or a phenyl group.

9. The process of claim 8 wherein $R_1$ and $R_3$ are hydrogen atoms.

10. The process of claim 3 wherein said hydroxyl reactive compound does not form a hydroxyl group on the capping carbon atom.

11. An end capped polycarbonate having improved thermal stability represented by the formula:

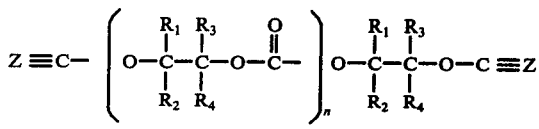

wherein:

$R_1$ is hydrogen, a halomethyl group, or a hydrocarbyl group having from 1 to 6 carbon atoms;

$R_3$ is hydrogen, a halomethyl group, or a hydrocarbyl group having from 1 to 6 carbon atoms;

$R_2$ and $R_4$ are hydrogen or a hydrocarbyl group having from 1 to 6 carbon atoms; or $R_1$, $R_2$, $R_3$ and $R_4$ are combined together constituting a carbocyclic ring of from 4 to 7 carbon toms;

$n$ is a number of from about 250 – 6,500 and

Z is hydrogen or the residual of a hydrocarbyl radical having from 1 to 20 carbon atoms and substituted derivatives thereof.

12. The polycarbonate of claim 11 wherein $R_2$ and $R_4$ are hydrogen atoms.

13. The composition of claim 12 wherein $R_1$ is selected from the group consisting of hydrogen and phenyl.

14. The polycarbonate of claim 13 wherein $R_3$ is selected from the group consisting of hydrogen and methyl groups.

15. The polycarbonate of claim 14 wherein $n$ is from about 500 to 1,500.

* * * * *